(12) United States Patent
Inoue

(10) Patent No.: US 10,231,470 B2
(45) Date of Patent: Mar. 19, 2019

(54) METHOD OF ASSEMBLING FROZEN DESSERT CONTAINER, METHOD OF PACKAGING FROZEN DESSERT, FROZEN DESSERT CONTAINER, FROZEN DESSERT PRODUCT, AND METHOD OF PREPARING DRINK

(71) Applicant: AKAGI NYUGYO CO., LTD., Fukaya-shi, Saitama (JP)

(72) Inventor: Sota Inoue, Saitama (JP)

(73) Assignee: Akagi Nyugyo Co., Ltd., Fukaya-shi, Saitama (JP)

(*) Notice: Subject to any disclaimer, the term of this patent is extended or adjusted under 35 U.S.C. 154(b) by 0 days.

(21) Appl. No.: 15/789,758

(22) Filed: Oct. 20, 2017

(65) Prior Publication Data

US 2018/0035690 A1 Feb. 8, 2018

Related U.S. Application Data

(62) Division of application No. 14/904,656, filed as application No. PCT/JP2014/078661 on Oct. 28, 2014, now Pat. No. 9,826,753.

(30) Foreign Application Priority Data

Dec. 27, 2013 (JP) ................. 2013-271257

(51) Int. Cl.
*A23G 9/22* (2006.01)
*B65D 85/78* (2006.01)
(Continued)

(52) U.S. Cl.
CPC .............. *A23G 9/221* (2013.01); *A23G 9/04* (2013.01); *A23G 9/045* (2013.01); *B65B 7/28* (2013.01);
(Continued)

(58) Field of Classification Search
CPC .......... A23G 9/221; A23G 9/04; A23G 9/045; B65B 7/28; B65D 51/18; B65D 51/28; B65D 51/78
See application file for complete search history.

(56) References Cited

U.S. PATENT DOCUMENTS

| | | | |
|---|---|---|---|
| 929,389 | A | 7/1909 | Clement |
| 1,275,138 | A | 8/1918 | Dieterich |

(Continued)

FOREIGN PATENT DOCUMENTS

| | | |
|---|---|---|
| AU | 23398/95 A | 1/1996 |
| CN | 2191397 Y | 3/1995 |

(Continued)

OTHER PUBLICATIONS

"Nikkei Trendy" Magazine (including an English translation thereof) issued on Aug. 2014.
(Continued)

*Primary Examiner* — Erik Kashnikow
*Assistant Examiner* — Chaim A Smith
(74) *Attorney, Agent, or Firm* — Birch, Stewart, Kolasch & Birch, LLP

(57) ABSTRACT

A molding container including a lid that can be smoothly pulled out of a molded frozen dessert with no damage to the molded frozen dessert is provided. A frozen dessert container assembling method of assembling: a main body capable of containing a frozen dessert; a first lid including a first peripheral edge portion and a protrusion that forms an inner space on the inner radius side of the first peripheral edge portion; and a second lid including a second peripheral edge portion and a cover portion is provided. This method includes the steps of: feeding the main body; causing the protrusion of the first lid to be contained in the main body and fitting the first peripheral edge portion and an opening
(Continued)

of the main body to each other; and covering the inner space of the first lid with the cover portion of the second lid and fitting the first peripheral edge portion and the second peripheral edge portion to each other.

18 Claims, 9 Drawing Sheets

(51) Int. Cl.
  *B65D 51/18*  (2006.01)
  *B65D 51/28*  (2006.01)
  *A23G 9/04*  (2006.01)
  *B65B 7/28*  (2006.01)
(52) U.S. Cl.
  CPC ............. *B65D 51/18* (2013.01); *B65D 51/28* (2013.01); *B65D 85/78* (2013.01); *B65D 2251/009* (2013.01); *B65D 2251/0018* (2013.01); *B65D 2251/0028* (2013.01); *B65D 2251/0081* (2013.01)

(56) References Cited

U.S. PATENT DOCUMENTS

| | | | |
|---|---|---|---|
| 1,280,422 A | 10/1918 | Dieterich | |
| 1,467,578 A | 9/1923 | Gianini | |
| 1,607,756 A | 11/1926 | Ingram | |
| 1,793,024 A | 2/1931 | Scofield | |
| 1,854,091 A | 4/1932 | Young | |
| 1,955,610 A | 4/1934 | Seipt | |
| 2,058,468 A | 10/1936 | Korwan | |
| 2,384,041 A | 9/1945 | Moore | |
| 2,674,960 A | 4/1954 | De Pasquale | |
| 2,746,402 A | 5/1956 | Baxter | |
| RE24,299 E | 4/1957 | De Pasquale | |
| 2,945,361 A | 7/1960 | Miller | |
| 2,961,849 A | 11/1960 | Hitchcock | |
| 3,288,344 A | 11/1966 | Woollen et al. | |
| 3,296,822 A | 1/1967 | Gram | |
| 3,337,077 A | 8/1967 | Wheaton, Jr. | |
| 3,461,192 A | 8/1969 | Di Stasio | |
| 3,807,194 A | 4/1974 | Bond | |
| 3,834,437 A | 9/1974 | Swett et al. | |
| 4,018,904 A | 4/1977 | Muraoka | |
| 4,074,827 A | 2/1978 | Labe, III | |
| 4,089,433 A | 5/1978 | Jonsson | |
| 4,285,490 A | 8/1981 | Hanley | |
| 4,340,138 A | 7/1982 | Bernhardt | |
| 4,348,421 A | 9/1982 | Sakakibara et al. | |
| 4,482,047 A | 11/1984 | Ackermann et al. | |
| 4,503,572 A | 3/1985 | Dawson | |
| 4,582,197 A | 4/1986 | Lin | |
| 4,638,645 A | 1/1987 | Simila | |
| 4,798,313 A | 1/1989 | Farley | |
| 5,082,136 A | 1/1992 | Schumann | |
| 5,180,079 A | 1/1993 | Jeng | |
| 5,224,646 A | 7/1993 | Biancosino | |
| 5,493,866 A | 2/1996 | Hotaling | |
| 5,626,897 A | 5/1997 | Goldstein | |
| 5,971,829 A | 10/1999 | Hartman | |
| 5,979,695 A | 11/1999 | Valls et al. | |
| 6,190,226 B1 | 2/2001 | Conconi | |
| 6,514,555 B1 | 2/2003 | Fayard et al. | |
| 6,528,105 B1 | 3/2003 | Gerhart et al. | |
| 6,557,351 B1 | 5/2003 | Ghedini et al. | |
| 6,596,333 B1 | 7/2003 | Vaghela et al. | |
| 7,124,603 B2 | 10/2006 | Bianco | |
| 7,341,754 B1 | 3/2008 | Loh et al. | |
| 7,754,257 B2 | 7/2010 | Matsumoto et al. | |
| 7,820,214 B2 | 10/2010 | Groenke | |
| 8,402,722 B2 | 3/2013 | Buesching | |
| 8,794,485 B2 | 8/2014 | Lunn et al. | |
| D723,871 S | 3/2015 | Khubani et al. | |
| D763,621 S | 8/2016 | Szymanski | |
| 2003/0003215 A1 | 1/2003 | Huang et al. | |
| 2008/0085342 A1 | 4/2008 | Binley et al. | |
| 2008/0187633 A1 | 8/2008 | Cox | |
| 2008/0203051 A1 | 8/2008 | Dusel | |
| 2011/0262600 A1 | 10/2011 | McGill | |
| 2012/0104042 A1 | 5/2012 | Tirone et al. | |
| 2012/0108407 A1 | 5/2012 | Trani et al. | |
| 2013/0068774 A1 | 3/2013 | Buck | |
| 2013/0156918 A1 | 6/2013 | Reinhardt et al. | |
| 2014/0065267 A1 | 3/2014 | Albano et al. | |
| 2015/0173557 A1 | 6/2015 | Jang et al. | |
| 2015/0291312 A1 | 10/2015 | Kalagher | |
| 2015/0366236 A1 | 12/2015 | Inoue | |
| 2016/0088960 A1 | 3/2016 | Liang | |
| 2016/0324184 A1 | 11/2016 | Inoue | |

FOREIGN PATENT DOCUMENTS

| | | |
|---|---|---|
| CN | 202820710 U | 3/2013 |
| CN | 105752508 A | 7/2016 |
| EP | 0942882 B1 | 2/2004 |
| EP | 2382870 A1 | 11/2011 |
| GB | 2450909 A | 1/2009 |
| JP | 61-26074 U | 2/1986 |
| JP | 61-150490 U | 9/1986 |
| JP | 62-52185 U | 4/1987 |
| JP | 2-56190 U | 4/1990 |
| JP | 2-80519 U | 6/1990 |
| JP | 7-4164 Y2 | 2/1995 |
| JP | 7-30084 U | 6/1995 |
| JP | 9-121778 A | 5/1997 |
| JP | 10-117692 A | 5/1998 |
| JP | 3051376 U | 8/1998 |
| JP | 2590743 Y2 | 2/1999 |
| JP | 2000-201625 A | 7/2000 |
| JP | 2000-247333 A | 9/2000 |
| JP | 2001-48281 A | 2/2001 |
| JP | 2001-122315 A | 5/2001 |
| JP | 2002-27917 A | 1/2002 |
| JP | 2004-522453 A | 7/2004 |
| JP | 2005-119729 A | 5/2005 |
| JP | 2007-76709 A | 3/2007 |
| JP | 2008-500031 A | 1/2008 |
| JP | 2008-200049 A | 9/2008 |
| JP | 3154863 U | 10/2009 |
| JP | 2010-17163 A | 1/2010 |
| JP | 2010-22330 A | 2/2010 |
| JP | 2012-510267 A | 5/2012 |
| JP | 2013-524822 A | 6/2013 |
| JP | 2013-153732 A | 8/2013 |
| JP | 5536273 B1 | 7/2014 |
| TW | 425269 B | 3/2001 |
| WO | WO 89/05764 A1 | 6/1989 |
| WO | WO 90/08710 A1 | 8/1990 |
| WO | WO 99/18011 A2 | 4/1999 |
| WO | WO 2007/087967 A1 | 8/2007 |
| WO | WO 2011/141129 A1 | 11/2011 |

OTHER PUBLICATIONS

Chinese Office Action and Search Report, dated Feb. 2, 2016, for Chinese Application No. 201480005389.7.
Chinese Office Action and Search Report, dated Jun. 27, 2016, for Chinese Application No. 201480005389.7.
Decision to Grant a Patent (including an English translation thereof) issued in the corresponding Japanese Patent Application No. 2015-548528 dated May 17, 2016.
Examination Report issued in the corresponding United Kingdom Patent Application No. GB1601247.8 dated Aug. 2016.
International Preliminary Report on Patentability (Forms PCT/IB/338, PCT/IPEA/409 and PCT/IPEA/416), dated Jun. 30, 2016, for International Application No. PCT/JP2014/078661, with an English translation of Form PCT/IPEA/409.
International Search Report and Written Opinion of the International Searching Authority (Forms PCT/ISA/210, PCT/ISA/220 and PCT/ISA/237), dated Dec. 16, 2014, for International Application No. PCT/JP2014/075465.

(56) References Cited

OTHER PUBLICATIONS

International Search Report, issued in PCT/JP2014/078661, dated Jan. 20, 2015.
Japanese Office Action (including a partial English translation thereof) issued in the corresponding Japanese Patent Application No. 2016-202154 dated Aug. 29, 2017.
Japanese Office Action, dated Feb. 12, 2014, for Japanese Application No. 2013-271257.
Japanese Office Action, dated Jun. 7, 2016, for Japanese Application No. 2016-086489.
Japanese Reconsideration Report (including an English translation thereof), dated Nov. 15, 2016, for Japanese Application No. 2016-86489.
Korean Office Action (including a partial English translation thereof) issued in the corresponding Korean Patent Application No. 10-2017-7007336 dated Jul. 25, 2017.
Korean Office Action (including a partial English translation thereof) issued in the corresponding Korean Patent Application No. 10-2017-7007338 dated Jul. 25, 2017.
Korean Office Action, dated Dec. 2, 2015, for Korean Application No. 10-2015-7021457.
Notification Reason(s) for Rejection (including an English translation thereof) issued in the corresponding Japanese Patent Application No. 2016-202154 dated May 30, 2017.
Notification of Reason(s) for Rejection (including an English translation thereof) issued in the corresponding Japanese Patent Application No. 2015-548528 dated Feb. 23, 2016.
Office Action (including a partial English translation thereof) issued in the corresponding Korean Patent Application No. 10-2016-7002373 dated Oct. 10, 2016.
Office Action issued in the corresponding Chinese Patent Application No. 201480048551.3 dated Sep. 8, 2016.
Taiwanese Office Action and Search Report, dated Jul. 14, 2015, for Taiwanese Application No. 103139912.
Taiwanese Office Action and Search Report, dated May 23, 2016, for Taiwanese Application No. 103139914.
U.S. Office Action dated Dec. 16, 2016, for U.S. Appl. No. 14/766,599.
U.S. Office Action, dated Mar. 11, 2016, for U.S. Appl. No. 14/766,599.

Fig. 9A

FREEZING POINT OF FROZEN DESSERT

| | ADDED AMOUNT (kg) | MIXTURE (kg) | MOL CONCENTRATION | FREEZING POINT DEPRESSION |
|---|---|---|---|---|
| MONOSACCHARIDE RATIO | 634.65 | 2380 | 1.480127 | -2.747116 |
| DISACCHARIDE RATIO | 164.0795 | 2380 | 0.201405 | -0.373808 |
| POLYSACCHARIDE RATIO | 42.375 | 2380 | 0.029948 | -0.055584 |
| FINAL FREEZING POINT (°C) | | | | -3.18 |

Fig. 9B

FREEZING POINT OF SHAVED-ICE TYPE ICED LOLLIPOP

| | ADDED AMOUNT (kg) | MIXTURE (kg) | MOL CONCENTRATION | FREEZING POINT DEPRESSION |
|---|---|---|---|---|
| MONOSACCHARIDE RATIO | 250.935 | 2340 | 0.595233 | -1.104752 |
| DISACCHARIDE RATIO | 531.3775 | 2340 | 0.663408 | -1.231284 |
| POLYSACCHARIDE RATIO | 4.2375 | 2340 | 0.003046 | -0.005653 |
| FINAL FREEZING POINT (°C) | | | | -2.34 |

METHOD OF ASSEMBLING FROZEN DESSERT CONTAINER, METHOD OF PACKAGING FROZEN DESSERT, FROZEN DESSERT CONTAINER, FROZEN DESSERT PRODUCT, AND METHOD OF PREPARING DRINK

CROSS-REFERENCE TO RELATED APPLICATIONS

This application is a Divisional of co-pending application Ser. No. 14/904,656 filed on Jan. 12, 2016, which is a National Phase of PCT International Application No. PCT/JP2014/078661 filed on Oct. 28, 2014, which claims priority under 35 U.S.C. § 119(a) to Patent Application No. 2013-271257 filed in Japan on Dec. 27, 2013. All of the above applications are hereby expressly incorporated by reference into the present application.

TECHNICAL FIELD

The present invention relates to a method of assembling a frozen dessert container for containing a frozen dessert such as ice cream or sherbet, a method of packaging a frozen dessert, a frozen dessert container, a frozen dessert product, and a method of preparing drink.

BACKGROUND ART

Molding containers that can form, in a frozen dessert such as ice cream, a hollow (a recess) into which a drink such as coffee, juice, or alcohol is to be poured have been widely known. With such a molding container, by pouring a drink such as coffee, juice, or alcohol into the hollow formed in the frozen dessert and then mixing the frozen dessert and the drink, a drink in a frozen state (a frozen drink) can be easily prepared.

For example, Patent Literature 1 discloses an example of such a molding container, i.e., a frozen dessert container including a container lid having a conical protrusion. This container lid can form a conical recess in the central portion of a frozen dessert. Patent Literature 2 discloses a container including a cap with its central portion protruding downward. This cap can form a space to be filled with an additional food material at the center of an iced mixture.

CITATION LIST

Patent Literature

Patent Literature 1: Japanese Patent Application Laid-Open No. Hei. 10-117692
Patent Literature 2: Japanese Utility Model Registration No. 2590743

SUMMARY OF INVENTION

Technical Problem

However, when the container lid having the conical protrusion is attached to such a conventional container, i.e., in the state of a finished product, the container lid has a deep recess. Thus, unwanted matter such as dust is more likely to penetrate into the recess when the product is on display in a shop, for example. Therefore, such a container has a problem of unhygienic appearance.

Before drinking the frozen dessert, the peripheral edge portion of the container lid is grasped (held) to pull out the container lid. In the state of the finished product, however, the protrusion of the container lid sticks to the frozen dessert and therefore, in some cases, cannot be pulled out of the frozen dessert smoothly due to insufficient strength of the peripheral edge portion of the container lid, for example. Thus, there is also a problem in terms of the ease of handling the container lid.

In recent years, a system in which a dedicated server for coffee, for example, is installed in a convenience store or the like and a consumer helps oneself to purchase a drink has become popular. For providers (shops), an increase in the kinds of drinks that can be offered has been desired.

For consumers, there is a wish to casually enjoy a wide variety of drinks having creative textures and flavors, which are provided in restaurants or the like, without going to the restaurants or the like (by purchasing such drinks at convenience stores or supermarkets).

The present invention has been made to solve the above conventional problems. It is an object of the present invention to provide a method of assembling a frozen dessert container, a method of packaging a frozen dessert, and a frozen dessert container that can maintain hygienic appearance of a frozen dessert container lid having a protrusion (to be a recess in the state of a finished product) and can facilitate handling in a case when the container lid is pulled out and in other cases. Furthermore, it is an object of the present invention to provide a frozen dessert product and a method of preparing drink that allows a consumer to casually enjoy a wide variety of drinks having creative textures and flavors without going to restaurants or the like.

Solution to Problem

The present invention is a frozen dessert container assembling method of assembling: a main body capable of containing a frozen dessert; a first lid including a first peripheral edge portion and a protrusion that forms an inner space on the inner radius side of the first peripheral edge portion; and a second lid including a second peripheral edge portion and a cover portion. The frozen dessert container assembling method is characterized by including the steps of: feeding the main body; causing the protrusion of the first lid to be contained in the main body and attaching the first peripheral edge portion to an opening of the main body; and covering the inner space of the first lid with the cover portion of the second lid and attaching the second peripheral edge portion to the first peripheral edge portion in a state in which the first peripheral edge portion is separable from the opening more easily than from the second peripheral edge portion.

Furthermore, the present invention is a frozen dessert packaging method of enclosing a frozen dessert in a container including: a main body capable of containing a frozen dessert; a first lid including a first peripheral edge portion and a protrusion that forms an inner space on the inner radius side of the first peripheral edge portion; and a second lid including a second peripheral edge portion and a cover portion. The frozen dessert packaging method is characterized by including the steps of: feeding the main body; causing the frozen dessert to be contained in the main body; causing part of the protrusion of the first lid to be immersed into the frozen dessert and attaching the first peripheral edge portion to an opening of the main body so that the first peripheral edge portion can be removed from the opening of the main body with a first force; and covering the inner space of the first lid with the cover portion of the second lid and attaching the second peripheral edge portion to the first peripheral edge portion so that the first peripheral edge portion can be removed from the second peripheral edge portion with a second force larger than the first force.

Still further, the present invention is a frozen dessert container including: a main body capable of containing a frozen dessert; a first lid including a first peripheral edge portion and a protrusion that forms an inner space on an inner radius side of the first peripheral edge portion; and a second lid including a second peripheral edge portion and a cover portion. The frozen dessert container is characterized in that the first lid is configured such that the first peripheral edge portion can be attached to the opening of the main body so that the protrusion is contained in the main body, and the second lid is configured such that the cover portion covers the inner space of the first lid and the second peripheral edge portion can be attached to the first peripheral edge portion in a state in which the first peripheral edge portion is separable from the opening more easily than from the second peripheral edge portion.

Still further, the present invention is a frozen dessert product frozen with a recess formed in a central portion thereof by being contained in the aforementioned frozen dessert container.

Still further, the present invention is a drink preparation method of preparing a drink by defrosting at least part of a frozen dessert frozen with a recess formed in a central portion thereof by being contained in the above-described frozen dessert container. The drink preparation method is characterized by including the steps of: removing the lid from the main body to expose the said recess in the central portion of the frozen dessert; applying an external force from an outer surface of the main body toward the recess to crush the frozen dessert into a desired shape; and injecting liquid into the frozen dessert to defrost at least part of the frozen dessert.

Advantageous Effects of Invention

The method of assembling a frozen dessert container, the method of packaging a frozen dessert, and the frozen dessert container according to the present invention can provide excellent effects in that even the frozen dessert container lid having the protrusion (recess as a finished product) can maintain its hygienic appearance and facilitate handling in a case when the container lid is pulled out and in other cases. Moreover, the method of preparing a frozen drink according to the present invention can provide excellent effects in that the kinds of drinks provided by a dedicated server at a convenience store or the like can be increased and a frozen dessert product and a method of preparing drink a consumer can casually enjoy without going to a restaurant or the like can be provided.

BRIEF DESCRIPTION OF DRAWINGS

FIG. 5A is an overall exploded side view thereof, FIG. 5B is a side cross-sectional view illustrating an assembled state, and FIG. 5C is a partial enlarged view of FIG. 5B.

FIGS. 9A-B show tables for comparing freezing points of the frozen dessert 18 of the second embodiment and shaved-ice type iced lollipop with each other.

DESCRIPTION OF EMBODIMENTS

First Embodiment

A molding container (frozen dessert container) according to a first embodiment of the present invention will next be described in detail with reference to the drawings.

<Overall Configuration>

Figure 1:
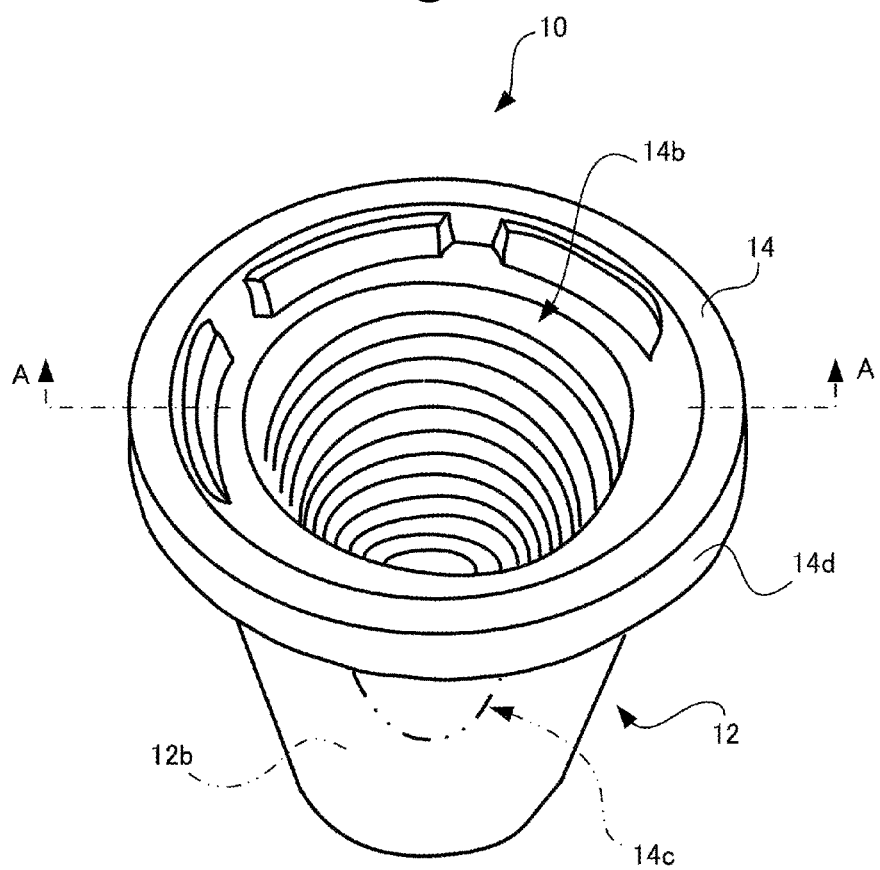
FIG. 1 is an external perspective view of a molding container 10 according to the first embodiment as viewed from above.
Figure 2:
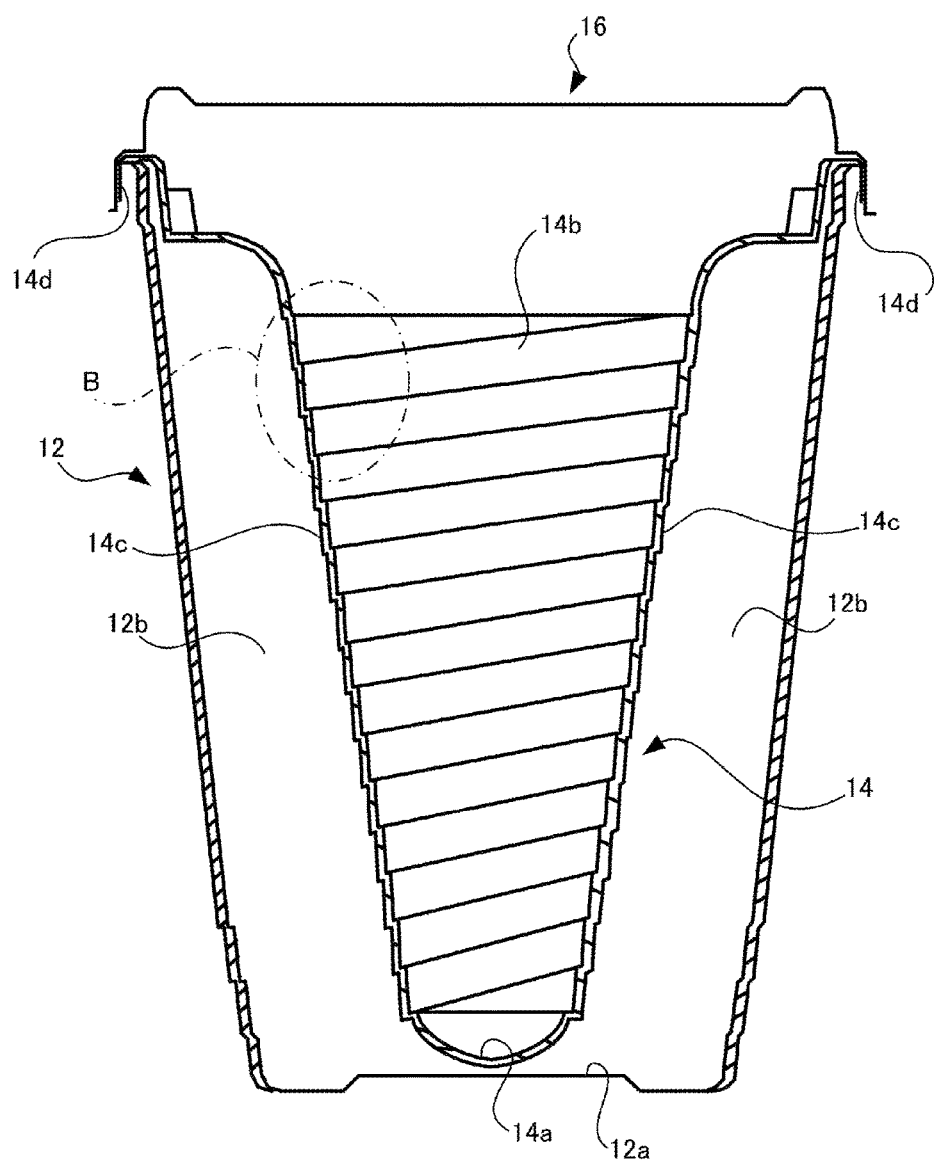
FIG. 2 is a side cross-sectional view taken along line A-A in FIG. 1.

FIG. 1 is an external perspective view of a molding container (frozen dessert container) 10 according to the embodiment of the present invention as viewed from above, and FIG. 2 is a side cross-sectional view taken along line A-A in FIG. 1. In FIG. 1, the illustration of an outer lid 16 is omitted, for the convenience of description.

This molding container 10 is configured to include: a cylindrical main body 12 that is a container for a frozen dessert such as ice cream or sherbet and capable of containing such a frozen dessert; an inner lid 14 that has an inverted conical shape, is partially contained in the inner space of the main body 12, and fitted to the upper portion of the main body 12; and the outer lid 16 fitted to the upper portions of the main body 12 and the inner lid 14. The molding container 10 in this example includes the outer lid 16. However, the molding container according to the present invention may not include the outer lid 16 or may include, instead of the outer lid 16, a seal that can close the main body 12 and the inner lid 14 from above.

<Main Body>

The main body 12 will next be described. The main body 12 is a thin-walled semi-transparent (or transparent) member having a cylindrical shape. One end (the upper end) of the main body 12 is open, and a bottom portion 12a is formed at the other end (the lower end). An inner space 12b of the main body 12 can contain a frozen dessert 18 such as ice cream or sherbet (see FIG. 4B). In this example, since the main body 12 is a semi-transparent member, the state of the frozen dessert contained in the main body 12 can be easily checked visually. The color of the main body 12 is not limited to be semitransparent or transparent but the main body 12 may be colored. If the frozen dessert 18 to be contained therein is required to be protected from light, the main body 12 may preferably be colored.

No particular limitation is imposed on the size, shape, and material of the main body 12, so long as the main body 12 has a size and a shape that allow the main body 12 to contain the frozen dessert. Therefore, the shape of the main body 12 may be, for example, a polygonal tubular shape or a conical shape. Any of plastics, metals, paper, and edible containers (such as wafers and cones) can be used as the material of the main body 12 according to its application. Examples of the frozen dessert contained in the main body 12 include, in addition to ice cream and sherbet, jelly, pudding, sherbet, and shaved ice. Preferably, a material that resists cracking even at refrigeration temperature is used for the main body 12.

<Inner Lid>

The inner lid 14 will next be described. The inner lid 14 is a white thin-walled lid having an inverted conical shape that is a tapered shape having an outer diameter gradually decreasing from one end (the upper end) toward the other end (the lower end). The one end (the upper end) of the inner lid 14 is open, and a bottom portion 14a is formed at the other end (the lower end). An inverted conical-shaped inner space 14b of the inner lid 14 can contain a sweet material such as the flesh of a fruit, a fruit, or a baked sweet. The color of the inner lid 14 is not limited to white.

No particular limitation is imposed on the size, shape, and material of the inner lid 14, so long as the inner lid 14 can mold the frozen dessert contained in the main body 12. Therefore, the shape of the inner lid 14 may be, for example, a cylindrical shape. Any of plastics, metals, paper, and edible containers (such as wafers and cones) can be used as the material of the inner lid 14 according to its application.

Figure 3:
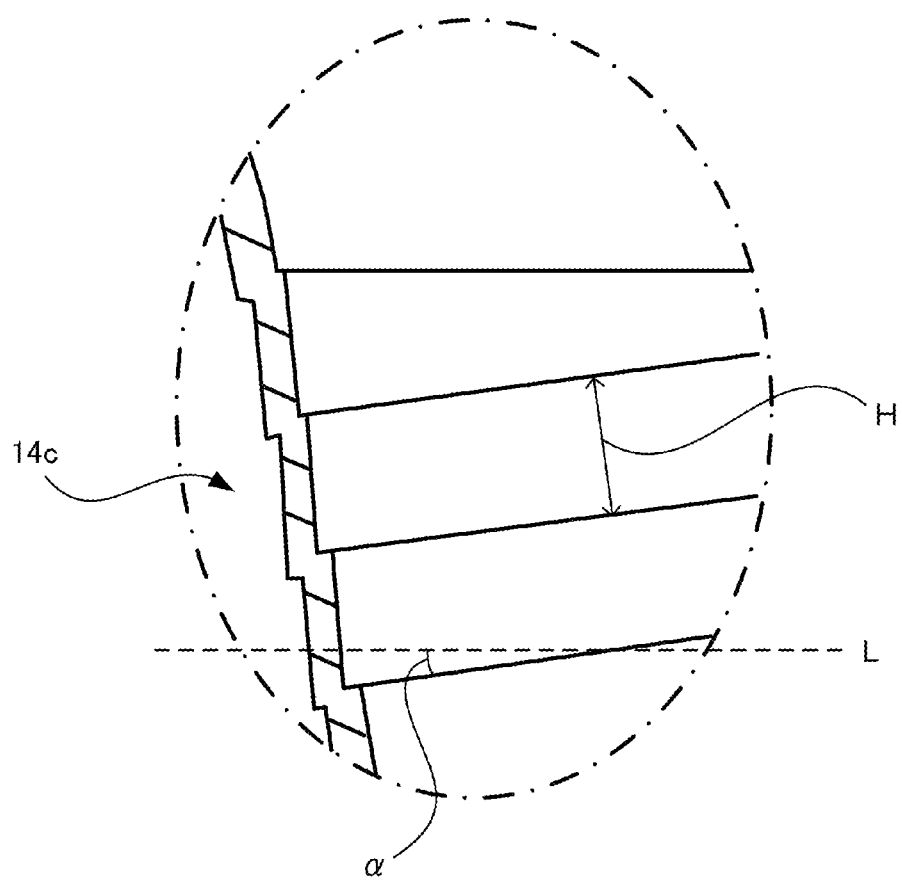
FIG. 3 is a partial enlarged view illustrating a region indicated by symbol B in FIG. 2 in an enlarged scale.

FIG. 3 is a partial enlarged view illustrating a region indicated by symbol B in FIG. 2 in an enlarged scale. A spiral step is formed on an outer surface 14c of the inner lid 14 so as to extend from the one end (the upper end) toward the other end (the lower end).

In this example, the width H of the step is substantially constant (about 2 mm in this example) over a region from the one end (the upper end) to the other end (the lower end), and the inclination angle α of the step with respect to the horizontal line L is also substantially constant (about 20 degrees in this example) over the region from the one end (the upper end) to the other end (the lower end).

The width and inclination angle of the step are not limited to those in this example. For example, the width H of the step may decrease gradually from the one end (the upper end) toward the other end (the lower end). The inclination angle α of the step may be set to an angle other than 20 degrees.

A holding portion 14d protruding outward is formed over the entire upper end portion of the inner lid 14. The holding portion 14d is a portion on which the user places one's fingers when the inner lid 14 is fitted to the main body 12 and when the inner lid 14 is rotated to remove it from the frozen dessert. No particular limitation is imposed on the shape of the holding portion 14d. For example, one or a plurality of recesses or protrusions may be formed in the holding portion 14d so that the user can easily place one's fingers thereon.

<Usage Method of Molding Container>

Figure 4A:
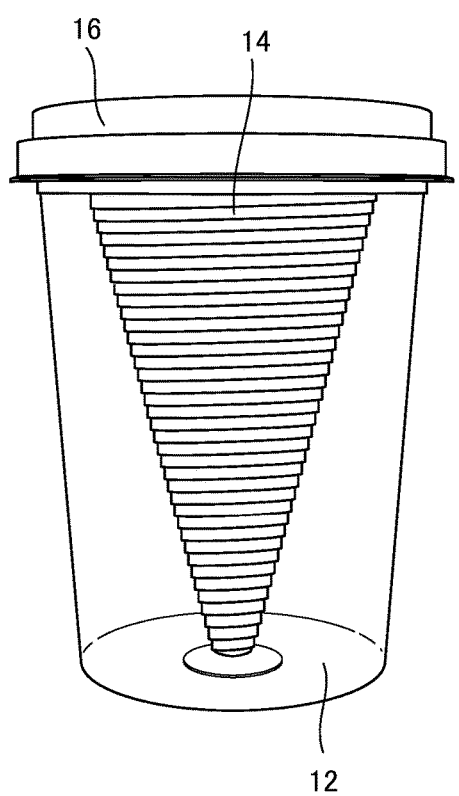
FIG. 4A is a photograph taken before a frozen dessert 18 is contained in the molding container 10.
Figure 4B:
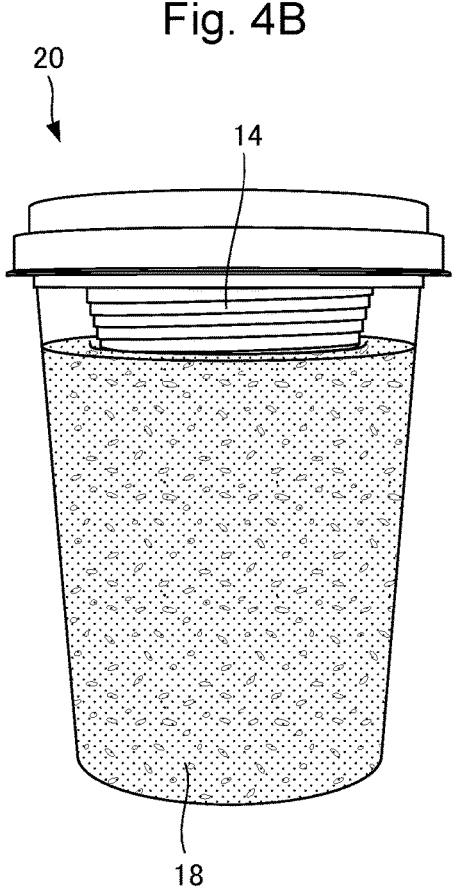
FIG. 4B is a photograph taken after the frozen dessert 18 is molded in the molding container 10.

The usage method of the molding container 10 will next be described with reference to FIGS. 4A and 4B. FIG. 4A is a photograph taken before the frozen dessert 18 is contained in the molding container 10, and FIG. 4B is a photograph taken after the frozen dessert 18 is molded in the molding container 10.

When the frozen dessert 18 such as ice cream or sherbet is molded, the outer lid 16 and the inner lid 14 are first detached from the main body 12, and the frozen dessert 18 in an unfrozen state is contained in the inner space of the main body 12. Next, the inner lid 14 is fitted to the main body 12 to cause the frozen dessert 18 to adhere sufficiently to the outer surface 14c of the inner lid 14, and then the main body 12 with the inner lid 14 fitted thereto is placed in, for example, a freezer to freeze the frozen dessert 18.

After the frozen dessert 18 freezes, fingers are placed on the holding portion 14d of the inner lid 14, and the inner lid 14 is pulled upward out of the frozen dessert 18 while rotated along the spiral step formed on the surface of the frozen dessert 18. A hollow (a drink-filling space) having a shape complementary to the outer surface of the inner lid 14 is thereby molded in the frozen dessert 18.

A drink such as coffee, juice, or alcohol is poured into the thus-molded hollow of the frozen dessert 18. Then the drink is cooled by the frozen dessert 18, changes into ice form, and is mixed with part of the frozen dessert 18, whereby a frozen drink is prepared.

As described above, the molding container according to this embodiment (for example, the molding container 10) is a molding container including a main body (for example, the main body 12) capable of containing the frozen dessert and a lid (for example, the inner lid 14) capable of molding at least part of the frozen dessert contained in the main body. The molding container is characterized in that a spiral step is formed on the outer surface of the lid.

In the molding container 10 according to this embodiment, since the step is formed on the outer surface of the lid (the inner lid 14), a step having a shape complementary to the step of the lid can be formed on the molded frozen dessert. Therefore, when a drink such as coffee, juice, or alcohol is poured into the molded frozen dessert, the area of contact with the drink can be made larger than that when no step is formed, so that the drink can be rapidly changed into a frozen drink.

In addition, the lid can be prevented from firmly adhering to the frozen dessert when the frozen dessert is molded, so that the lid can be more smoothly pulled out of the frozen dessert as compared to the case in which no step is formed. For example, when the molding container is used to provide a frozen drink to a customer, the frozen drink can be quickly provided.

Since the step formed on the outer surface of the lid has a spiral form, the lid can be smoothly pulled out of the frozen dessert by rotating the lid along the spiral step formed on the surface of the frozen dessert. This can solve the conventional problems in that the frozen dessert is partially damaged when the lid is pulled out and therefore the liquid poured into the frozen dessert cannot be cooled sufficiently and that the lid is deformed in shape when the lid is pulled out and therefore it is difficult to reuse the lid.

A holding portion (for example, the holding portion 14d) for rotating the lid may be provided at one end of the lid.

With this configuration, the lid can be easily rotated, so that the lid can be more smoothly pulled out of the frozen dessert.

The lid has an inverted conical shape with an opening, and the holding portion may be disposed in the opening.

With this configuration, the area of contact with the frozen dessert can be gradually reduced in a direction away from the holding portion. Therefore, the rotating force required to rotate the lid can be gradually reduced in the direction away from the holding portion, so that the lid can be pulled out of the frozen dessert more smoothly.

An inner space that can contain a sweet material may be formed in the lid.

With this configuration, the sweet material to be added to the frozen drink can be contained separately from the frozen dessert, so that the application of the molding container can be widened.

The configuration of the molding container according to the present invention is not limited to the configuration of the molding container 10 described in the above embodiment. For example, the shape of the inner lid 14 is not limited to the inverted conical shape and may be a cylindrical shape. In the illustrated example, the inner space is formed in the inner lid 14. However, the inner space may not be formed. Moreover, the holding portion 14*d* may not be provided to the inner lid 14.

Example 1

A molding container having the same shape as that of the molding container 10 (Example) and a conventional molding container including an inner lid with no step on its outer surface (having a flat outer surface) (Comparative Example) were used to mold sherbet, and comparisons were made on the ease of pulling out the inner lid and the shape of the molded frozen dessert.

The result of the experiment showed that, in the molding container according to the Comparative Example, the inner lid adhered to the frozen dessert and could not be pulled out smoothly. However, in the molding container according to the Example, by rotating the inner lid along the spiral step formed on the surface of the frozen dessert, the inner lid could be pulled out smoothly.

In the molding container according to the Comparative Example, the molded frozen dessert was sometimes damaged when the inner lid was pulled out. However, in the molding container according to the Example, the inner lid could be pulled out smoothly with no damage to the molded frozen dessert.

Second Embodiment

<Frozen Dessert Container (Molding Container)>

A frozen dessert container according to the second embodiment of the present invention will next be described with reference to the drawings. The following embodiment takes, as an example, a case where a frozen dessert container 110 has a configuration very similar to that of the molding container 10 of the first embodiment. However, the frozen dessert container 110 may have a configuration different from that of the molding container 10. For example, an outer surface of an inner lid 114 may have no spiral step formed thereon.

Figure 5A:
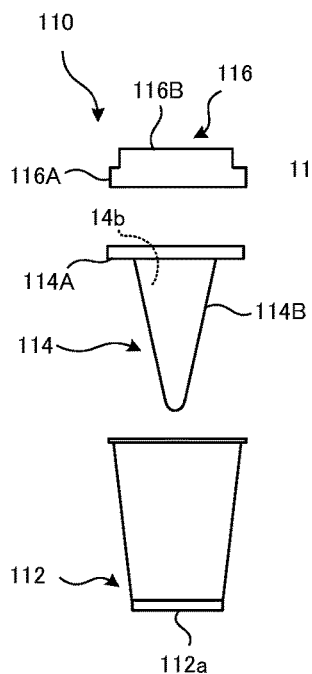
FIGS. 5A-C include diagrams illustrating a frozen dessert container (molding container) 110 according to a second embodiment.
Figure 5B:
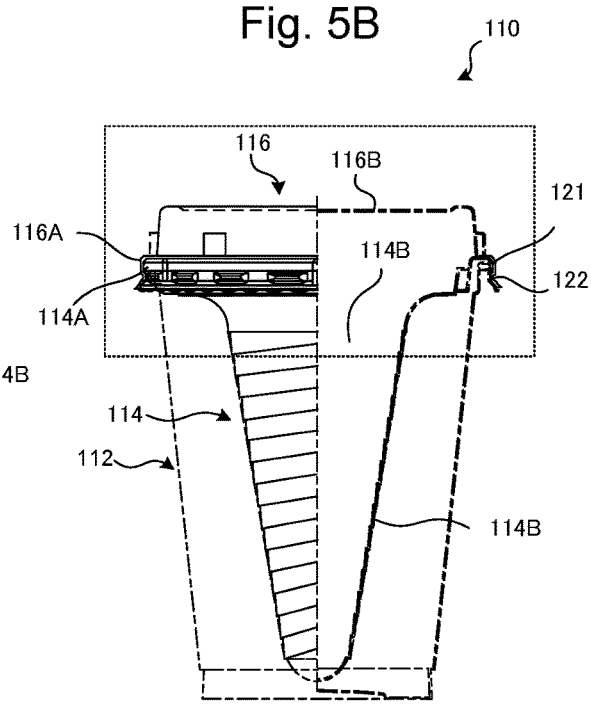
Figure 5C:
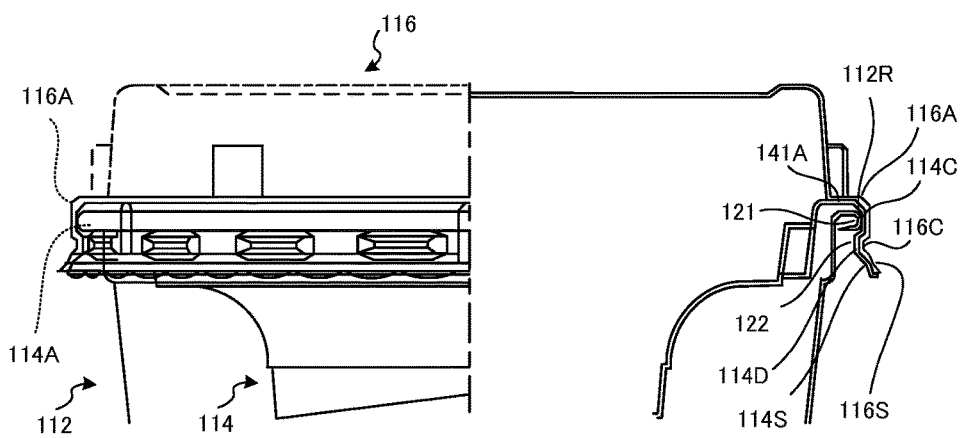

FIGS. 5A-C include diagrams illustrating the frozen dessert container 110. FIG. 5A is an overall exploded side view thereof, FIG. 5B is a side cross-sectional view illustrating an assembled state, and FIG. 5C is an enlarged view illustrating a dashed portion in FIG. 5B.

As shown in FIG. 5A, the frozen dessert container 110 includes: a main body 112 capable of containing a frozen dessert; a first lid (inner lid) 114; and a second lid (outer lid) 116. In the second embodiment, configurations of which descriptions are omitted are similar to those of the main body 12, the inner lid 14, and the outer lid 16 of the first embodiment. Here, an example of the material for the main body 112 is polypropylene. An example of the material for the inner lid 114 and the outer lid 116 is polystyrene.

The inner lid 114 includes: a first peripheral edge portion (inner lid peripheral edge portion) 114A; and a protrusion 114B for molding a frozen dessert (hereinafter referred to as the molding protrusion 114B) that forms an inner space 14*b* on the inner radius side of the inner lid peripheral edge portion 114A. The outer lid 116 includes: a second peripheral edge portion (outer lid peripheral edge portion 116A); and a cover portion 116B. The cover portion 116B may have any shape so long as the cover portion 116B can cover the inner space 14*b* of the inner lid 114. However, it is desirable that the cover portion 116B have a flat shape (or a shape similar to flatness as much as possible) over which impurities such as dust are less likely to deposit and from which such impurities can be easily removed.

As shown in FIGS. 5B and 5C, the inner lid peripheral edge portion 114A of the inner lid 114 and an opening of the main body 112 are fitted to each other. More specifically, an end of the opening of the main body 112 is curled outward so as to form a curved surface 112R over the entire perimeter thereof as shown in FIG. 5C. The inner lid peripheral edge portion 114A, on the other hand, is formed in an inverted generally U-shape for covering the opening of the main body 112. An inner side surface of the generally U-shape of the inner lid peripheral edge portion 114A is positioned inside the main body 112. An outer side surface of the generally U-shape of the inner lid peripheral edge portion 114A is positioned outside the main body 112. At the same time, from the upper side to the lower side in FIG. 5C, a peripheral edge protrusion 114C and a peripheral edge recess 114D are provided so as to conform to the curved surface 112R of the main body 112. An outermost end of the outer side surface of the generally U-shape of the inner lid peripheral edge portion 114A forms a skirt portion 114S flaring from the center side to the outer side. With such a structure, the curved surface 112R of the main body 112 and the peripheral edge protrusion 114C of the inner lid peripheral edge portion 114A are fitted to (engaged with) each other. This fitted portion is hereinafter referred to as a first fitted portion 121.

The outer lid peripheral edge portion 116A of the outer lid 116 and the inner lid peripheral edge portion 114A of the inner lid 114 are fitted to each other. More specifically, the outer lid peripheral edge portion 116A is formed in an inverted generally L-shape so as to cover an outer portion of the generally U-shape of the inner lid peripheral edge portion 114A. A peripheral edge recess 116C is provided in the outer lid peripheral edge portion 116A. An outermost end of the outer lid peripheral edge portion 116A forms a skirt portion 116S flaring from the center side to the outer side. With such a structure, fit is made in such a manner that the peripheral edge recess 116C of the outer lid peripheral edge portion 116A is contained in the peripheral edge recess 114D of the inner lid peripheral edge portion 114A. This fitted portion is hereinafter referred to as a second fitted portion 122. At this time, the skirt portion 116S of the outer lid peripheral edge portion 116A overlaps the skirt portion 114S of the inner lid peripheral edge portion 114A in a substantially unified manner. The outer lid 116 engages with only the inner lid 114.

When the main body 112, the inner lid 114, and the outer lid 116 are assembled together, the fitted portion (second fitted portion 122) between the inner lid 114 and the outer lid 116 is positioned closer to a bottom portion 112*a* (lower side) of the main body 112 than the fitted portion (first fitted portion 121) between the main body 112 and the inner lid peripheral edge portion 114A.

With such a configuration, the opening side of the molding protrusion 114B of the inner lid 114 is covered by the cover portion 116B of the outer lid 116. Therefore, when those are displayed in shops as frozen dessert products, for example, impurities such as dust can be prevented from entrance into the inner space 14*b* created by the molding protrusion 114B. Thus, the hygienic appearance can be maintained.

The frozen dessert product will be described later in detail. To open the frozen dessert product enclosing a frozen dessert in the frozen dessert container 110 of the present embodiment, the outer lid peripheral edge portion 116A of the outer lid 116 is held to remove the outer lid 116 from the main body 112. At this time, the inner lid 114 is removed from the main body 112 together with the outer lid 116 with the inner lid 114 fitted to the outer lid 116. In other words, a fit structure between the inner lid 114 and the main body 112 is configured to be separable more easily than a fit structure between the inner lid 114 and the outer lid 116. This will be described below.

When the outer lid 116 is removed from the main body 112, the outer lid 116 is pulled up (sometimes while being rotated about the axis of the main body 112) in a direction (upward) away from the main body 112. At this time, according to the configuration of the present embodiment, the skirt portion 116S of the outer lid 116 positioned outermost and distant from a side surface of the main body 112 or its upper portion including the skirt portion 116S is typically held and the outer lid 116 is pulled up (while being rotated). At this time, the inner lid 114 and the outer lid 116 are fitted to each other in the second fitted portion 122, and the skirt portion 114S of the inner lid 114 and the skirt portion 116S of the outer lid 116 overlap each other in a substantially unified manner. Therefore, the inner lid 114 and the outer lid 116 are less likely to be separated from each other and thus the inner lid 114 can be pulled up simultaneously with the outer lid 116.

In the first fitted portion 121, the curved surface 112R of the main body 112 and the peripheral edge protrusion 114C of the inner lid peripheral edge portion 114A are fitted to each other while being abutted against each other. In the second fitted portion 122, in contrast, the inner lid 114 and the outer lid 116 are fitted to each other by groove shapes (the peripheral edge recess 114D and the peripheral edge recess 116C) with (substantially) no curved surface. In other words, a frictional force by the fit between the inner lid 114 and the main body 112 is smaller than a frictional force by the fit between the inner lid 114 and the outer lid 116.

Furthermore, in pulling the outer lid 116 (and the inner lid 114) upward, the outer lid peripheral edge portion 116A and the inner lid peripheral edge portion 114A in the first fitted portion 121 flare outward when the second fitted portion 122 gets over the curved surface 112R. A stress due to such elastic deformation is exerted on the second fitted portion 122 positioned lower than the first fitted portion 121, and the second fitted portion 122 is thereby pushed inward.

With such a configuration, the fit structure between the inner lid 114 and the main body 112 is configured to be separable more easily than the fit structure between the inner lid 114 and the outer lid 116 in the present embodiment.

Here, the sentence "the fit structure between the inner lid 114 and the main body 112 is configured to be separable more easily than the fit structure between the inner lid 114 and the outer lid 116" can be reworded such that a degree of fit between the inner lid peripheral edge portion 114A and the opening of the main body 112 (the first fitted portion 121) is weaker than a degree of fit between the inner lid peripheral edge portion 114A and the outer lid peripheral edge portion 116A (the second fitted portion 122). More specifically, if the fitted inner lid 114 can be removed from the main body 112 again with a predetermined force (first force) (fit in the first fitted portion 121 is performed in such a state), it can also be said that a predetermined force (second force) larger than the first force is needed to remove the fitted inner lid 114 from the outer lid 116 again (fit in the second fitted portion 122 is performed in such a state).

In the present embodiment, the fit structure between the inner lid 114 and the main body 112 only needs to be separable more easily than the fit structure between the inner lid 114 and the outer lid 116. In other words, the configuration in which the degrees of ease of separability of the fit structures are varied is not limited to the above configuration. Such a configuration can be appropriately selected depending on the materials of the main body 112, the inner lid 114, and the outer lid 116, or the shapes of the fit structures, for example.

This allows even the double structure of the inner lid 114 and the outer lid 116 to be handled as a single lid for a frozen dessert product. Thus, the handling of the frozen dessert product is facilitated.

Moreover, the outer lid 116 can allocate a large area for the outer lid peripheral edge portion 116A and the vicinity thereof. This increases a holdable area as compared to a case having only the inner lid 114. The handling ability of the outer lid 116 can thereby be improved, and thus the lid (the outer lid 116 and the inner lid 114) can be easily removed from the main body 112.

Furthermore, when a frozen dessert product is produced by enclosing a frozen dessert 18 in the frozen dessert container 110 of the present embodiment, an external force is applied, before drinking, to the main body 112 by externally kneading the main body 112 with both hands, for example, and the frozen dessert 18 is thereby crushed into a drink (its details will also be described later). For this reason, the main body 112 is configured to have a large flexural deformation amount and to be deformable with a smaller force.

Specifically, the main body 112 is a member made of polypropylene, for example, and formed in a cylindrical shape. The inner lid 114, on the other hand, is a member made of polystyrene, for example, and formed to have the protrusion in which the inner space 14b is formed.

The tensile elastic modulus of the inner lid 114 is 1378.2 Mpa for polystyrene, for example. The tensile elastic modulus of the main body 112 is 1136.8 Mpa for polypropylene, for example. These tensile elastic modulus are physical property values measured by a measuring method in conformity with JIS K7127 under given conditions. The above tensile elastic modulus is an average value between a tensile elastic modulus (strength) obtained when a resin during sheet forming is pulled in a sheet delivery direction and a tensile elastic modulus (strength) obtained when the resin during sheet forming is pulled in a direction (the direction of the sheet width) perpendicular to the delivery direction. This tensile elastic modulus is the physical property value of the material indicating "the ease of deformation" defined by the JIS. As the numerical value becomes smaller, it can be said that the material is softer (having a larger flexural deformation amount).

With such a configuration, the flexural deformation amount when the main body 112 is held by both hands of an adult, for example, and an external force (pressing force) is externally applied to the main body 112 becomes larger than the flexural deformation amount when the external force (pressing force) is similarly applied externally to the inner lid 114.

As an example, the outer lid 116 is formed from the same material as the inner lid 114. Therefore, the flexural deformation amount when the main body 112 is held and an external force (pressing force) is externally applied to the main body 112 becomes larger than the flexural deformation amount when the external force (pressing force) is applied externally to the outer lid 116.

The main body 112 has the flexural deformation amount larger than that of the inner lid 114 (or the outer lid 116).

However, once a frozen dessert is filled in the main body 112 and the inner lid 114 is attached to the main body 112, the hard inner lid 114 serves as a core. Thus, the strength as a frozen dessert product can be maintained. Furthermore, the attachment of the outer lid 116 to the inner lid 114 can enhance the strength of the main body 112, especially in the vicinity of the opening thereof. This also leads to maintaining the strength of the frozen dessert product. When the outer lid 116 (and the inner lid 114) is removed from the main body 112, on the other hand, the frozen dessert can be easily crushed by the flexure of the main body 112.

It is only necessary that at least the inner lid 114 has a flexural deformation amount smaller than that of the main body 112. The materials and flexural deformation amounts of the inner lid 114 and the outer lid 116 may be different from each other.

<Method of Assembling Frozen Dessert Container and Method of Packaging Frozen Dessert>

Figure 6:
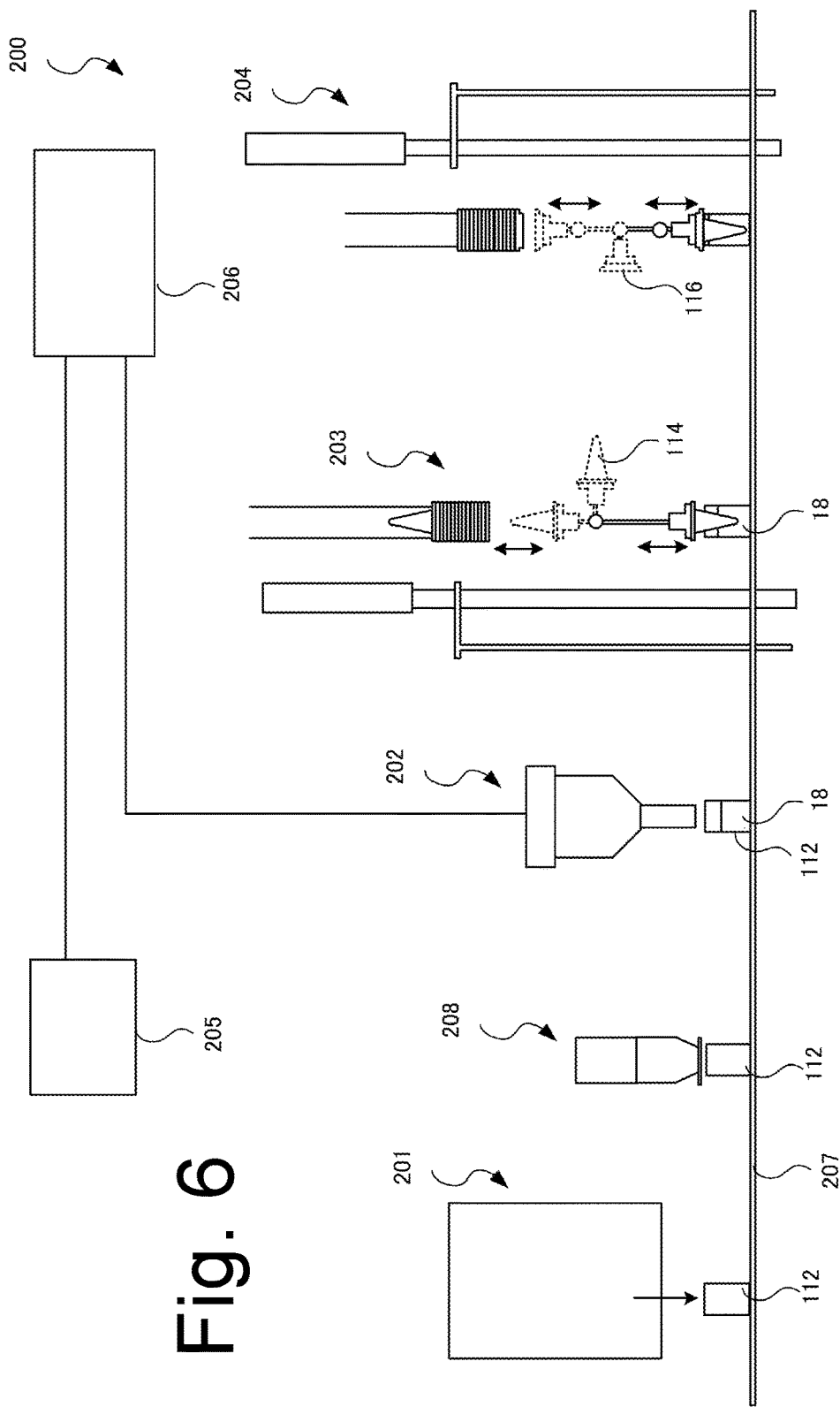
FIG. 6 is a schematic side view illustrating an example of a production line 200 for packaging a frozen dessert of the second embodiment.
Figure 7A:
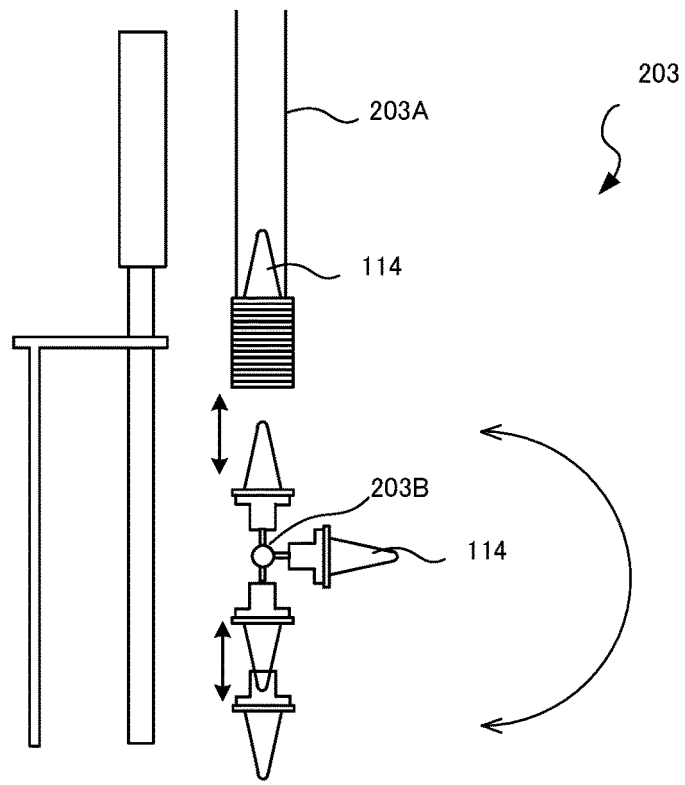
FIGS. 7A-B are side views illustrating parts of FIG. 6 in an extracted manner.
Figure 7B:
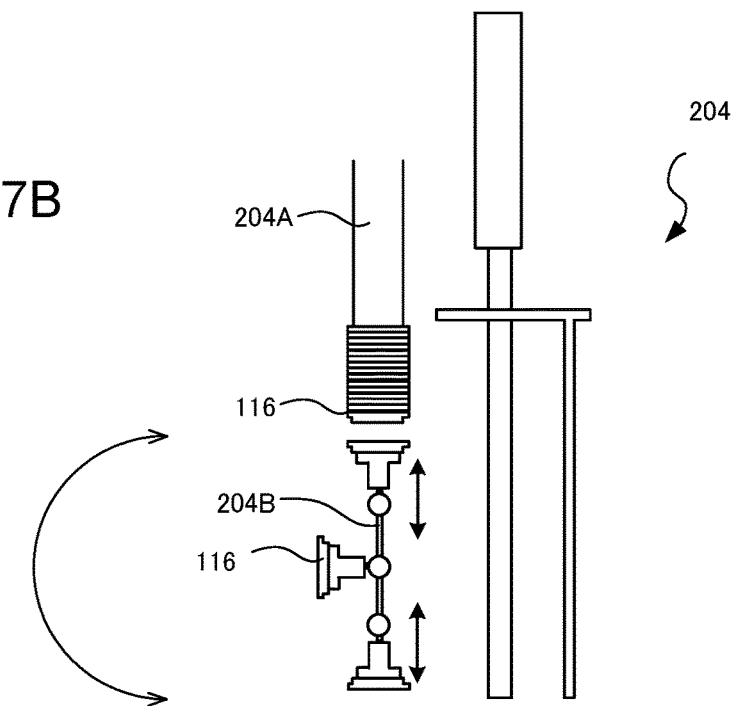

With reference to FIGS. 6 and 7, a step of assembling the frozen dessert container 110 and a method of packaging a frozen dessert with the frozen dessert container 110 will be described. FIG. 6 is a schematic view of a production line 200 illustrating a step of packaging a frozen dessert. FIG. 7A is a side view illustrating an inner lid capper 203 in an extracted manner. FIG. 7B is a side view illustrating an outer lid capper 204 in an extracted manner. Since the frozen dessert container 110 is assembled during the step of packaging a frozen dessert, these will be described together below.

The production line 200 mainly includes: a main body feed device 201; a filling machine 202; the inner lid capper 203; the outer lid capper 204; an ice-shaving device 205 for the frozen dessert 18 (for example, a shaved ice mixture); and a line crusher 206 for adjusting the ice grain size of the frozen dessert 18. In FIG. 6, configurations necessary for the description of the present embodiment are illustrated in an extracted manner and known components are omitted as appropriate.

Inside the main body feed device 201, a plurality of main bodies 112 are stocked in a stacked manner. The plurality of main bodies 112 are taken out one by one by a robot hand (not shown). After printing is made on its bottom portion, the main body 112 is placed on a conveyer 207 with the opening thereof positioned on the upper side, and conveyed in a downstream direction (to the right in FIG. 6). Extraneous matter on the outer circumference and in the inside of the main body 112 is removed by an extraneous matter removing device 208 while the main body 112 is conveyed. The main body 112 is then moved to a place directly below the filling machine 202. The filling machine 202 is filled with the frozen dessert 18 obtained by shaving ice with the ice-shaving device 205 and then adjusting the ice grain size with the line crusher 206. The filling machine 202 recognizes the main body 112 moving below the filling machine 202 and fills the main body 112 with a predetermined amount of the frozen dessert 18. In such filling, an overrun of the frozen dessert 18 is adjusted within 10% to 30%, for example.

When the main body 112 filled with the frozen dessert 18 is moved downstream, the inner lid 114 is attached to the main body 112 by the inner lid capper 203. As shown in FIG. 7A in an enlarged scale, in a stock section 203a of the inner lid capper 203, a plurality of inner lids 114 are stocked in a stacked manner with the molding protrusions 114B directed upward. A robot hand 203b is positioned directly below the stock section 203a. The robot hand 203b takes out the bottommost inner lid 114 one by one, rotates the inner lid 114 by 180 degrees, and attaches the inner lid 114 to the main body 112 with the molding protrusion 114B directed downward.

The molding protrusion 114B of the inner lid 114 is thereby immersed into the frozen dessert 18 and contained in the main body 112 as shown in FIG. 6. Smooth immersion is achieved since the inner lid 114 is brought into contact with the frozen dessert 18 from the tapered tip of the molding protrusion 114B. Thus, a splash of the frozen dessert 18 or the like can be prevented from occurring.

The inner lid peripheral edge portion 114A of the inner lid 114 and the opening of the main body 112 are fitted to each other. Here, a degree of the fit between the inner lid peripheral edge portion 114A and the opening of the main body 112 is set so that the fitted inner lid 114 can be removed again from the main body 112 with a predetermined force (first force). The first force needed for the removal (the degree of the fit between the inner lid 114 and the main body 112) is appropriately selected depending on the materials of the both or the shape of the fit structure, for example.

When the main body 112 with the inner lid 114 attached thereto is further moved downstream, the outer lid 116 is attached to the inner lid 114 by the outer lid capper 204. As shown in FIG. 7B in an enlarged scale, in a stock section 204a of the outer lid capper 204, a plurality of outer lids 116 are stocked in a stacked manner with the inner side thereof (frozen dessert side) directed upward. A robot hand 204b is positioned directly below the stock section 204a. The robot hand 204b takes out the bottommost outer lid 116 one by one, rotates the outer lid 116 by 180 degrees, and attaches the outer lid 116 to the inner lid 114.

Consequently, the cover portion 116B of the outer lid 116 covers the inner space 14b of the molding protrusion 114B in the inner lid 114, and the inner lid peripheral edge portion 114A of the inner lid 114 and the outer lid peripheral edge portion 116A of the outer lid 116 are fitted to each other as shown in FIGS. 5 and 6. Here, a degree of the fit between the inner lid peripheral edge portion 114A and the outer lid peripheral edge portion 116A is set so that the fitted inner lid 114 can be removed again from the outer lid 116 with a predetermined force (second force) larger than the first force. The second force needed for the removal (the degree of the fit between the inner lid 114 and the outer lid 116) is appropriately selected depending on the materials of the both or the shape of the fit structure, for example.

In the present embodiment, the inner lid 114 and the outer lid 116 are attached to the main body 112 in the different steps. However, the inner lid 114 and the outer lid 116 may be fitted to each other as a unit in advance, and then the unit may be fitted to the main body 112 filled with the frozen dessert 18.

If the inner lid 114 and the outer lid 116 are fitted to each other as a unit in advance, however, the inner lids 114 and the outer lids 116 are unable to be stocked in a stacked manner as in the inner lid capper 203 and the outer lid capper 204 of the present embodiment. Therefore, such a method results in spatial inefficiency. Moreover, if a state of fit (engagement) between the inner lid 114 and the outer lid 116 is insufficient, there is a risk that either one of them is disconnected from the other and falls during the production process. Furthermore, since the inner lid 114 has the shape unable to stand by itself, means for holding the inner lid 114 is needed when the inner lid 114 and the outer lid 116 are fitted to each other. From the viewpoint of this matter, it is desirable to have a step in which the inner lid 114 is attached to the main body 112 and then the outer lid 116 is attached to the inner lid 114 as in the present embodiment.

The first fitted portion 121 has the fit structure separable more easily than the second fitted portion 122. However, when the inner lid 114 and the outer lid 116 are fitted to each other by holding them down from above, these structures have no influence thereon. Thus, the assembling can be easily performed.

<Frozen Dessert Product and Method of Preparing Drink>

Figure 8A:
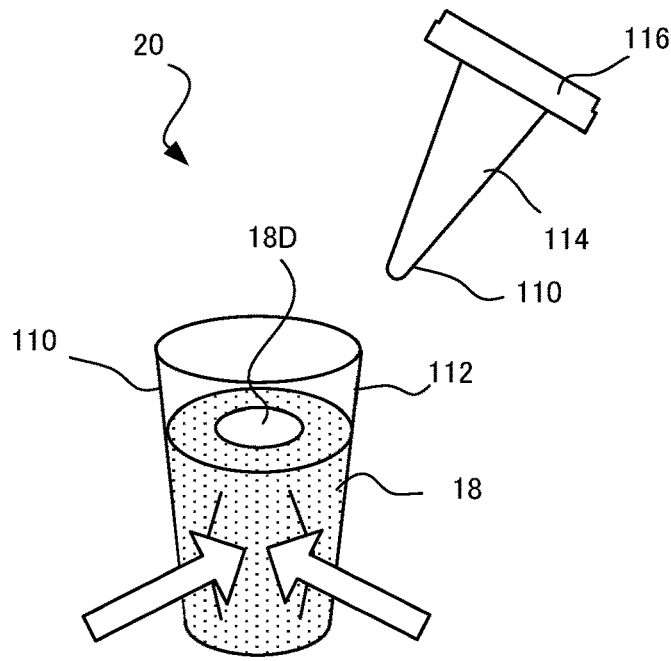
FIGS. 8A-B are schematic views for explaining a frozen dessert product 20 of the second embodiment.
Figure 8B:
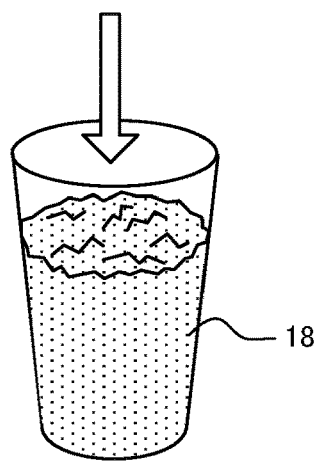

With reference to FIGS. 8A-b (and FIG. 4B), a frozen dessert product of the present embodiment and a method of preparing a drink using the frozen dessert product will be described.

A frozen dessert product 20 of the present embodiment is obtained by filling the frozen dessert container 110 with the frozen dessert 18 (see FIG. 4B). The frozen dessert 18 is frozen with a recess 18D formed in the central portion thereof by being contained in the frozen dessert container 110.

As shown in FIG. 8A, the outer lid 116 is removed from the main body 112 (the inner lid 114 is also removed simultaneously) before drinking. An external force is then applied from the outside of the main body 112 toward the hollow recess 18D created by the removal of the inner lid 114 by kneading the main body 112 with both hands, for example. The frozen dessert 18 is thereby crushed into a desired shape so as to infill the recess 18D. As shown in FIG. 8B, a drink such as coffee or milk is poured over the frozen dessert 18 crushed to some extent. This facilitates the defrosting of the frozen dessert 18 and allows a frozen drink to be prepared easily in a short period of time.

The frozen dessert product 20 is sold at a convenience store, for example. A consumer who purchased the frozen dessert product 20 pours a drink thereinto from a drink dedicated server placed at the store to prepare a frozen drink. More specifically, while the frozen dessert product 20 is stocked in a shop or the like and kept in a frozen state, it is desirable that the frozen dessert product 20 can be defrosted quickly before drinking. The frozen dessert 18 in the frozen dessert product 20 of the present embodiment is made softer than a typical shaved-ice type iced lollipop (referring to, for example, a commercially-available iced lollipop bar made of shaved ice, and hereinafter simply referred to as "shaved-ice type iced lollipop"). The frozen dessert 18 is molded so as to have the recess 18D in the central portion thereof. Furthermore, the main body 112 of the frozen dessert container 110 is configured to have a large flexural deformation amount. Here, "the frozen dessert 18 softer than the shaved-ice type iced lollipop" refers to the frozen dessert 18 having a freezing point lower than that of the shaved-ice type iced lollipop.

FIGS. 9A-B shows tables for comparing freezing points of the frozen dessert 18 of the present embodiment and the shaved-ice type iced lollipop (shaved-ice type iced lollipop bar) with each other. FIG. 9A is the table showing a calculation example for the freezing point of the frozen dessert 18 of the present embodiment. FIG. 9B is the table showing a calculation example for the freezing point of the shaved-ice type iced lollipop. In FIGS. 9A-B, a magnitude $\Delta T$ of freezing point depression is calculated by the following formula.

$$\Delta T = 1.856 \times \text{mol concentration} \quad \text{(Formula 1)}$$

The value "1.856" in Formula 1 is the freezing point depression constant for water.

Since the frozen dessert 18 and the shaved-ice type iced lollipop contain sugar, their freezing points become lower than 0° C. due to the freezing point depression. Moreover, the freezing point varies according to the blending ratio of sugar (monosaccharide, disaccharide, and polysaccharide). As shown in FIGS. 9A-B, the frozen dessert 18 of the present embodiment is made to have a freezing point lower than that of the typical shaved-ice type iced lollipop by adjusting the blending ratio of sugar. Consequently, the frozen state of the frozen dessert 18 of the present embodiment is softer than that of the typical shaved-ice type iced lollipop at the same temperature.

As an example, the final freezing point (the magnitude of the freezing point depression) of the frozen dessert 18 is −3.18° C. as shown in FIG. 9A. As shown in FIG. 9B, the final freezing point of the shaved-ice type iced lollipop is −2.34° C. The freezing point of the frozen dessert 18 is not limited to the value shown in FIG. 9A. When the freezing point of the shaved-ice type iced lollipop is −2.34° C., the freezing point of the frozen dessert 18 may be lower than or equal to −2.5° C. (−2.5° C. to −4° C.), for example. Furthermore, FIG. 9A only shows one freezing point calculation example for comparing the softness of the frozen dessert 18 of the present embodiment with that of the shaved-ice type iced lollipop. The magnitude of the freezing point depression varies also depending on other factors such as fruit juice, a dairy product, and a liqueur contained as ingredients. In other words, the frozen dessert 18 of the present embodiment only needs to have a freezing point lower than that of the shaved-ice type iced lollipop and thus to have a frozen state softer than that of the shaved-ice type iced lollipop at the same temperature.

This allows the frozen dessert 18 to be easily crushed into a desired shape by the application of an external force thereto (a level of an external force exerted by lightly kneading the main body with both hands of a person). The defrosting of the frozen dessert 18 is thereby facilitated. Thus, a consumer who purchased the frozen dessert product 20 can enjoy the frozen drink then and there.

In the present embodiment, the frozen dessert 18 is kneaded from the outside of the main body 112 and thereby crushed into the frozen drink before drinking. The container is designed so as to easily achieve this in a short period of time. More specifically, the main body 112 is made of a material that is easier to have flexural deformation than the inner lid 114 as described above. With such a configuration, however, the molding protrusion 114B of the hard inner lid 114 serves as a core when the frozen dessert product 20 is on display (on sale) in a shop or the like. In addition, due to the double structure of the inner lid 114 and the outer lid 116 in the lid portion, the strength of the frozen dessert product 20 in which the frozen dessert 18 is filled and sealed can be enhanced.

Moreover, the strength of the peripheral edge portion is enhanced by the double structure of the outer lid peripheral edge portion 116A and the inner lid peripheral edge portion 114A. Thus, when the inner lid 114 is removed from the main body 112 before drinking, the inner lid 114 can be easily pulled out by holding and rotating the outer lid peripheral edge portion 116A of the outer lid 116.

Moreover, the removal of the outer lid 116 from the main body 112 also achieves the simultaneous removal of the inner lid 114. Thus, even the double structure of the lid can facilitate the handing of the frozen dessert product 20 in a shop.

Furthermore, since the main body 112 is produced as a semi-transparent (or transparent) member, the state (crushed state by kneading) of the frozen dessert 18 therein can be easily checked visually. As already stated, the main body 112 may be colored. In this case, the frozen dessert 18 can be protected from light.

It is desirable that information suggesting to apply an external force to the main body 112 from the outside thereof toward the recess of the frozen dessert after the removal of the lid (the inner lid 114 and the outer lid 116) from the main body 112 (for example, illustration or textual information suggesting to crush the frozen dessert by externally kneading the main body 112 with both hands) be shown on the frozen dessert container 110 (the main body 112 or the outer lid 116).

As described above, the method of assembling a frozen dessert container (for example, the frozen dessert container 110) according to the present invention is a frozen dessert container assembling method of assembling: a main body (for example, the main body 112) capable of containing a frozen dessert (for example, the frozen dessert 18); a first lid (for example, the inner lid 114) including a first peripheral edge portion (for example, the inner lid peripheral edge portion 114A) and a protrusion (for example, the molding protrusion 114B) that forms an inner space (for example, the inner space 14*b*) on the inner radius side of the first peripheral edge portion; and a second lid (for example, the outer lid 116) including a second peripheral edge portion (for example, the outer lid peripheral edge portion 116A) and a cover portion (for example, the cover portion 116B). The method of assembling a frozen dessert container is characterized by including the steps of: feeding the main body; causing the protrusion of the first lid to be contained in the main body and fitting the first peripheral edge portion and an opening of the main body to each other; and covering the inner space of the first lid with the cover portion of the second lid and fitting the first peripheral edge portion and the second peripheral edge portion to each other.

With such a configuration, the opening side of the molding protrusion 114B in the inner lid 114 is covered by the cover portion 116B of the outer lid 116. This can prevent impurities such as dust from entrance into the inner space 14*b* created by the molding protrusion 114B when being on display in a shop as a frozen dessert product, for example. Thus, the hygienic appearance can be maintained.

After the first lid and the main body are fitted to each other, the second lid may be fitted to the first lid.

If the inner lid 114 and the outer lid 116 are fitted to each other as a unit in advance, the inner lids 114 and the outer lids 116 are unable to be stocked in a stacked manner as in the inner lid capper 203 and the outer lid capper 204 of the present embodiment. Therefore, such a method results in spatial inefficiency. Moreover, if a state of fit (engagement) between the inner lid 114 and the outer lid 116 is insufficient, there is a risk that either one of them is disconnected from the other and falls during the production process. Furthermore, since the inner lid 114 has the shape unable to stand by itself, means for holding the inner lid 114 is needed when the inner lid 114 and the outer lid 116 are fitted to each other. According to the present embodiment, however, the inner lids 114 and the outer lids 116 each can be stocked in a stacked manner, thereby eliminating a wasted space. Moreover, the disconnection between the inner lid 114 and the outer lid 116 can be prevented from occurring during the production process. In addition, another equipment such as holding means becomes unnecessary since the inner lid 114 can be directly attached to the main body.

Fit in a fitted portion between the first peripheral edge portion and the opening of the main body may be performed so as to be separable more easily than a fitted portion between the first peripheral edge portion and the second peripheral edge portion.

The method of packaging a frozen dessert according to the present invention is a frozen dessert packaging method of enclosing a frozen dessert in a container including: a main body (for example, the main body 112) capable of containing a frozen dessert (for example, the frozen dessert 18); a first lid (for example, the inner lid 114) including a first peripheral edge portion (for example, the inner lid peripheral edge portion 114A) and a protrusion (for example, the molding protrusion 114B) that forms an inner space (for example, the inner space 14*b*) on the inner radius side of the first peripheral edge portion; and a second lid (for example, the outer lid 116) including a second peripheral edge portion (for example, the outer lid peripheral edge portion 116A) and a cover portion (for example, the cover portion 116B). The method of packaging a frozen dessert is characterized by including the steps of: feeding the main body; causing the frozen dessert to be contained in the main body; causing part of the protrusion of the first lid to be immersed into the frozen dessert and fitting the first peripheral edge portion and an opening of the main body to each other; and covering the inner space of the first lid with the cover portion of the second lid and fitting the first peripheral edge portion and the second peripheral edge portion to each other.

With such a configuration, the opening side of the molding protrusion 114B in the inner lid 114 is covered by the cover portion 116B of the outer lid 116. This can prevent impurities such as dust from entrance into the inner space 14*b* created by the molding protrusion 114B when being on display in a shop as a frozen dessert product, for example. Thus, the hygienic appearance can be maintained.

The first peripheral edge portion and the opening of the main body may be fitted to each other in such a state that they can be removed from each other with a first force, and the first peripheral edge portion and the second peripheral edge portion may be fitted to each other in such a state that they can be removed from each other with a second force larger than the first force.

The frozen dessert container (for example, the frozen dessert container 110) of the present invention is a frozen dessert container including: a main body (for example, the main body 112) capable of containing a frozen dessert (for example, the frozen dessert 18); and a lid (for example, the inner lid 114) including a protrusion (for example, the molding protrusion 114B) that forms an inner space (for example, the inner space 14*b*) in a central portion thereof. The frozen dessert container is characterized in that a flexural deformation amount of the main body under the application of an external force is larger than a flexural deformation amount of the lid under the application of the external force.

With such a configuration, when the frozen dessert product 20 is produced by enclosing the frozen dessert 18 in the main body 112, the frozen dessert 18 can be easily kneaded and thereby crushed from the outside of the main body 112 after the removal of the lid (the inner lid 114). Thus, the frozen dessert 18 can be defrosted quickly before drinking.

Moreover, the molding protrusion 114B of the hard inner lid 114 serves as a core when the frozen dessert product 20 is on display (on sale) in a shop or the like. The strength of the frozen dessert product 20 in which the frozen dessert 18 is filled and sealed can thereby be enhanced.

A different lid (for example, the outer lid 116) for covering the lid may be provided, and the flexural deformation amount of the main body under the application of the external force may be larger than a flexural deformation amount of the different lid under the application of the external force.

With such a configuration, the lid has the double structure, and this enhances the strength of the peripheral edge portion. Thus, when the inner lid 114 is removed from the main body 112 before drinking, the inner lid 114 can be easily pulled out by holding and rotating the outer lid peripheral edge portion 116A of the outer lid 116.

The first peripheral edge portion of the lid and the opening of the main body may be fitted to each other in a first fitted portion (for example, the first fitted portion 121), and the second peripheral edge portion of the different lid and the first peripheral edge portion may be fitted to each other in a second fitted portion (for example, the second fitted portion 122). The second fitted portion may be positioned closer to a bottom portion of the main body than the first fitted portion.

The first peripheral edge portion and the second peripheral edge portion may overlap each other at respective ends thereof in a unified manner.

With such a configuration, the first fitted portion can be made separable more easily than the second fitted portion. This makes it possible to remove the inner lid 114 simultaneously with the removal of the outer lid 116 from the main body 112. Thus, even when the lid has the double structure, the handling thereof can be facilitated.

The frozen dessert product (for example, the frozen dessert product 20) of the present invention is a frozen dessert product frozen with a recess (for example, the recess 18D) formed in a central portion thereof by being contained in the aforementioned frozen dessert container (for example, the frozen dessert container 110).

With such a configuration, the frozen dessert 18 can be easily kneaded and thereby crushed from the outside of the main body 112. Thus, the frozen dessert 18 can be defrosted quickly before drinking.

Moreover, when the frozen dessert product 20 is on display (on sale) in a shop, for example, the molding protrusion 114B of the hard inner lid 114 serves as a core. Thus, the strength of the frozen dessert product 20 in which the frozen dessert 18 is filled and sealed can be enhanced.

The frozen dessert may have freezing point depression lower than that of a typical shaved-ice type iced lollipop.

With such a configuration, the frozen dessert itself can be made softer than a normal shaved-ice type iced lollipop, for example. Thus, such a frozen dessert can be crushed more easily before drinking and therefore made into a drink in a short period of time.

Information suggesting to apply an external force to the main body from the outside thereof toward the recess after the removal of the lid from the main body may be shown on the frozen dessert container.

The method of preparing a drink (for example, a frozen drink) according to the present invention is a drink preparation method of preparing a drink by defrosting at least part of a frozen dessert (for example, the frozen dessert 18) frozen with a recess (for example, the recess 18D) formed in a central portion thereof by being contained in a container including a main body (for example, the main body 112) and a lid (for example, the inner lid 114) with a protrusion (for example, the molding protrusion 114B) formed in a central portion thereof. The method of preparing a drink is characterized by including the steps of: removing the lid from the main body; applying an external force from an outer surface of the main body toward the recess to crush the frozen dessert into a desired shape; and injecting liquid into the frozen dessert to defrost at least part of the frozen dessert.

In recent years, a system in which drinks are served from a dedicated server installed in a shop such as a convenience store has become popular. At present, a main kind of such drinks is coffee. Accordingly, an increase in the kinds of drinks is desired by both shops and consumers. In restaurants or the like, a wide variety of drinks having various creative textures and flavors are now being served. Consumers also have a wish to enjoy such drinks casually without going to the restaurants or the like.

By the frozen dessert product of the present embodiment, frozen drinks conventionally served at restaurants or the like can be purchased in accessible shops such as convenience stores and casually enjoyed. Alternatively, such frozen drinks can be purchased at supermarkets or the like and enjoyed at home.

While one example of the present embodiment has been described above, the frozen dessert container of the second embodiment is not limited to the above example so long as the frozen dessert container includes: the main body 112 capable of containing the frozen dessert 18; and the lid (the inner lid 114) having the molding protrusion 114B that forms the inner space 14b in the central portion thereof.

For example, the shape of the molding protrusion in the inner lid 114 of the frozen dessert container 110 may be a cylindrical shape, or a plurality of molding protrusions 114B may be provided. The groove of the inner lid 114 is not limited to the spiral shape. A plurality of linear grooves may be provided in the depth direction of the molding protrusion 114B. Alternatively, no groove may be provided. When no groove is provided in the molding protrusion 114B, a surface of the molding protrusion 114B (surface to be in contact with the frozen dessert) may have super-water-repellent finish or may have the application of a lubricant, for example, in order to facilitate the separation from the frozen dessert.

As with the first embodiment, the inner space 14b of the inner lid 114 may house a food material. So long as the outer lid 116 is removed from the main body 112, the inner lid 114 and the outer lid 116 can be easily separated from each other. Thus, a food material housed in the inner space 14b of the inner lid 114 can be taken out and added to the frozen drink. In this manner, a wide variety of flavors can be enjoyed.

Moreover, the frozen dessert container 110 may be a disposable container or a container reusable after washing.

Furthermore, if the inner lid peripheral edge portion 114A of the inner lid 114 is designed to have sufficient strength, the outer lid 116 may be a seal-shaped cover member.

INDUSTRIAL APPLICABILITY

The present invention can be used to provide a frozen drink at a convenience store or the like.

REFERENCE SIGNS LIST 10 molding container
12, 112 main body
12a bottom portion
14, 114 inner lid
14a bottom portion
14b inner space
14c outer surface
14d holding portion
16, 116 outer lid
18 frozen dessert
110 frozen dessert container 114A inner lid peripheral edge portion
114B molding protrusion
116A outer lid peripheral edge portion
116B cover portion

The invention claimed is:

1. A frozen dessert packaging method of enclosing a frozen dessert in a container including: a main body capable of containing a frozen dessert; a first lid including a first peripheral edge portion and a protrusion that forms an inner space on an inner radius side of the first peripheral edge portion; and a second lid including a second peripheral edge portion and a cover portion, the frozen dessert packaging method comprising the steps of:
providing the main body;
causing a frozen dessert to be contained in the main body;
causing part of the protrusion of the first lid to be immersed into the frozen dessert and attaching the first peripheral edge portion to an opening of the main body so that the first peripheral edge portion can be removed from the opening of the main body with a first force; and
covering the inner space of the first lid with the cover portion of the second lid and attaching the second peripheral edge portion to the first peripheral edge portion so that the first peripheral edge portion can be removed from the second peripheral edge portion with a second force larger than the first force.

2. The frozen dessert packaging method according to claim 1, wherein
the first peripheral edge portion is fit to the opening to be attached thereto, and
the second peripheral edge portion is fit to the first peripheral edge portion to be attached thereto.

3. A frozen dessert container comprising:
a main body capable of containing a frozen dessert;
a first lid including a first peripheral edge portion and a protrusion that forms an inner space on an inner radius side of the first peripheral edge portion; and
a second lid including a second peripheral edge portion and a cover portion, wherein
the first lid is configured such that the first peripheral edge portion can be attached to an opening of the main body so that the protrusion is contained in the main body, and
the second lid is configured such that the cover portion covers the inner space of the first lid and the second peripheral edge portion can be attached to the first peripheral edge portion in a state in which the first peripheral edge portion is separable from the opening more easily than from the second peripheral edge portion.

4. The frozen dessert container according to claim 3, wherein the first peripheral edge portion and the opening are fitted to each other in a first fitted portion, the second peripheral edge portion and the first peripheral edge portion are fitted to each other in a second fitted portion, and the second fitted portion is positioned closer to a bottom portion of the main body than the first fitted portion.

5. The frozen dessert container according to claim 4, wherein the first peripheral edge portion and the second peripheral edge portion overlap each other at respective ends thereof in a unified manner.

6. The frozen dessert container according to claim 5, wherein a flexural deformation amount of the main body under application of an external force is larger than at least one of a flexural deformation amount of the first lid and a flexural deformation amount of the second lid.

7. A frozen dessert product frozen with a recess formed in a central portion thereof by being contained in the frozen dessert container according to claim 3.

8. The frozen dessert product according to claim 7, wherein information suggesting to apply an external force to the main body from the outside thereof toward the recess after removal of the first lid from the main body is shown on the frozen dessert container.

9. A drink preparation method of preparing a drink by defrosting at least part of a frozen dessert frozen with a recess formed in a central portion thereof by being contained in the frozen dessert container according to claim 3, the drink preparation method comprising the steps of:
removing the first lid from the main body to expose the said recess in the central portion of the frozen dessert;
applying an external force from an outer surface of the main body toward the recess to crush the frozen dessert into a desired shape; and
injecting a liquid into the frozen dessert to defrost at least part of the frozen dessert.

10. A frozen dessert container capable of containing a frozen dessert and a liquid, comprising:
a main body capable of containing a frozen dessert; and
a removable lid having at center portion a protrusion for forming a recess in a frozen dessert contained in the main body, wherein
the removable lid are removably disposed on the main body so that after removing the lid from the main body, the frozen dessert remained in the main body can be crushed into a desired shape by applying an external force from an outer surface of the main body toward the recess and a liquid are accommodated in the main body, and
a flexural deformation amount of the main body when the external force is applied to the main body is larger than a flexural deformation amount of the removable lid when the external force is applied to the removable lid.

11. A frozen dessert contained in the frozen dessert container of claim 10.

12. The frozen dessert of claim 11, wherein
the frozen dessert has at a central portion a recess formed by removing the removable lid from the main body of the frozen dessert container.

13. The frozen dessert of claim 11, wherein
a frozen state of the frozen dessert contained in the main body is softer than that of the shaved ice at the same temperature.

14. The frozen dessert of claim 11, wherein
the frozen dessert contained in the main body has a freezing point lower than that of the shaved ice.

15. The frozen dessert of claim 11, wherein
the frozen dessert contains sugar in such an amount that a freezing point of the frozen dessert is lowered than that of the shaved ice, and
the frozen dessert is obtained by freezing a mixture of the shaved ice containing the sugar.

16. A drink preparation method of preparing a drink by using the frozen dessert of claim 11, the method comprising the steps of:
forming the recess at the central part of the frozen dessert by removing the removable lid from the main body of the frozen dessert container, prior to drinking the drink,
applying an external force from an outer surface of the main body toward the recess to crush the frozen dessert into a desired shape; and
injecting a liquid into the frozen dessert to defrost at least part of the frozen dessert.

17. The drink preparation method of claim 16, wherein
the liquid is injected into the frozen dessert which is crushed by applying the external force.

18. The frozen dessert container of claim 10, wherein
the main body comprises a material having a first tensile elastic modulus,
the removable lid comprises a material having a second tensile elastic modulus, and
the second tensile elastic modulus is greater than the first tensile elastic modulus.

* * * * *